United States Patent [19]

Nimerick

[11] Patent Number: 5,681,796
[45] Date of Patent: Oct. 28, 1997

[54] BORATE CROSSLINKED FRACTURING FLUID AND METHOD

[75] Inventor: Kenneth H. Nimerick, Tulsa, Okla.

[73] Assignee: Schlumberger Technology Corporation, Tex.

[21] Appl. No.: 283,129

[22] Filed: Jul. 29, 1994

[51] Int. Cl.$^6$ .................................... C09K 7/00
[52] U.S. Cl. .................... 507/209; 507/922; 507/110; 166/308
[58] Field of Search .................. 166/308; 507/922, 507/209, 110

[56] References Cited

U.S. PATENT DOCUMENTS

| | | |
|---|---|---|
| 3,215,634 | 11/1965 | Walker . |
| 3,740,360 | 6/1973 | Nimerick . |
| 3,766,984 | 10/1973 | Nimerick . |
| 3,974,077 | 8/1976 | Free .......................................... 507/211 |
| 4,033,415 | 7/1977 | Holtmyer et al. ....................... 166/308 |
| 4,514,309 | 4/1985 | Wadhwa . |
| 4,579,670 | 4/1986 | Payne . |
| 4,619,776 | 10/1986 | Mondshine . |
| 4,624,868 | 11/1986 | Muller .................................... 427/384 |
| 5,036,919 | 8/1991 | Thomas et al. . |
| 5,103,905 | 4/1992 | Brannon et al. . |
| 5,103,913 | 4/1992 | Nimerick et al. . |
| 5,211,859 | 5/1993 | Horton et al. . |
| 5,259,455 | 11/1993 | Nimerick et al. . |
| 5,271,466 | 12/1993 | Harms . |
| 5,330,005 | 7/1994 | Card et al. . |
| 5,372,732 | 12/1994 | Harris et al. . |

OTHER PUBLICATIONS

V. Pai, H. Lopez & M. Mikkelson, "Chemical, Design and Operational Considerations In The Usage Of The New Borate Crosslinked Fracturing Fluids", Southwestern Petroleum Short Course, 1992.

*Primary Examiner*—Sharon Gibson
*Assistant Examiner*—Valerie Fee
*Attorney, Agent, or Firm*—John E. Vick, Jr.

[57] ABSTRACT

The invention, in one embodiment, is a novel fracturing fluid composition comprising an aqueous metal hydrated galactomannan gum, buffered to a pH of from about 9 to about 11. In another embodiment, a method of fracturing a formation is disclosed, the method being characterized by the use of the compositions mentioned.

16 Claims, No Drawings

5,681,796

BORATE CROSSLINKED FRACTURING FLUID AND METHOD

This invention relates to the recovery of hydrocarbon fluids from subterranean formations. More particularly, the invention relates to a novel well treatment fluid, a process for its preparation, and to a method of treating or fracturing a subterranean formation using such fluid.

BACKGROUND OF THE INVENTION

In the process of recovering hydrocarbon values from subterranean formations, it is common practice to treat a hydrocarbon-bearing formation with a pressurized fluid to provide flow channels, i.e., to fracture the formation, or to use such fluids to control sand to facilitate flow of the hydrocarbons to the wellbore. Well treatment fluids, particularly those used in fracturing, typically comprise a water or oil based fluid incorporating a thickening agent, normally a polymeric material. The thickening agent helps to control leak-off of the fluid into the formation, and aids in the transfer of hydraulic fracturing pressure to the rock surfaces. Primarily, however, the thickening agent permits the suspension and transfer into the formation of proppant materials which remain in the fracture or sand when the hydraulic pressure is released, thereby holding the fracture open or stabilizing the sand.

Typical polymeric thickening agents for use in such fluids comprise galactomannan gums, such as guar and substituted guars such as hydroxypropyl guar and carboxymethylhydroxypropyl guar. Cellulosic polymers such as hydroxyethyl cellulose may be used, as well as synthetic polymers such as polyacrylamide. To increase the viscosity, and, therefore, the proppant carrying ability of the fracturing fluid, as well as increase its high temperature stability, crosslinking of the polymeric materials employed is also commonly practiced. Typical cross linking agents comprise soluble boron, zirconium, and titanium compounds.

By necessity, well treatment fluids are prepared on the surface, and then pumped through tubing in the wellbore to the hydrocarbon-bearing subterranean formation. While high viscosity, thickened fluid is highly desirable within the formation in order to transfer hydraulic pressure efficiently to the rock and to reduce fluid leak-off, large amounts of energy are required to pump such fluids through the tubing into the formation. To reduce the amount of energy required, various methods of delaying crosslinking have been developed. These techniques allow the pumping of a relatively less viscous fluid having relatively low friction pressures within the well tubing with crosslinking being effected near or in the formation so that the advantageous properties of thickened crosslinked fluid are available at the rock face.

One typical delayed crosslinking well treatment fluid system comprises borate crosslinked galactomannan gums such as guar or hydroxypropyl guar. The galactomannan polymers, which may be provided as a solid or as a suspension in a hydrocarbon, hydrate in neutral or acidic solution to form a gel. Under these conditions, i.e., pH of 7 or lower, no crosslinking of guar or hydroxypropyl guar will occur with borate ion. To effect borate crosslinking of guar and hydroxypropyl guar, the pH must be raised to at least 9.0. The requirement to raise the pH to this level has been exploited to delay the crosslinking of the galactomannan gums by borate ion.

The practice of delaying crosslinking of thickening agents in such fluids, however, presents its own set of difficulties. Thus, sophisticated techniques must be employed to adjust the pH of the fluid at the proper location, i.e., in or near the formation. U.S. Pat. No. 5,259,455, for example, describes the practice of controlled dissolution of MgO in a fracturing fluid to provide such pH adjustment. To be able to operate effectively where formation temperatures are above 200° F., the patent discloses additives to prevent the magnesium precipitation which would lower the pH of the system.

An alternative approach to downhole pH adjustment would be some reduction of the concentration of the thickening agent in the well treatment fluid, with crosslinking being accomplished or being only slightly delayed, the reduced loading thereby reducing the friction penalty. However, reduction of the thickening agent concentration (i.e., use of a lower concentration) in such fluids has not been practiced to any significant extent because of a long-established belief by those skilled in the art that minimum levels of loading of the thickening agents mentioned are required for effective or sufficient crosslinking. In the case of guar, for example, this concentration has been considered to be about 17 pounds of guar per one thousand gallons of aqueous fracturing fluid. This belief was based on studies of the radius of gyration of the guar molecule and the theory that if the radius of gyration of two molecules in solution do not overlap, the molecules cannot be crosslinked to produce the type of gel required for reliable fracturing operations. As a general proposition, most well treatment solutions employed in the field utilizing crosslinking of the thickening agent prior to the invention have utilized concentrations of the delayed crosslinking thickening agents that are well above the level mentioned, and, typically, 30 pounds per 1000 gallons of liquid or greater are used.

Accordingly, a need has existed for a well treatment fluid, especially a fracturing fluid, that exhibits relatively low friction loss in the well tubing, while avoiding the difficulties associated with raising the pH at the proper time or location, and further avoids those difficulties associated with insufficient crosslinking. Further, there has existed a need for an effective fluid having reduced concentrations of thickening agent or agents, thereby reducing the costs of such solutions and improving the conductivity of the formations. Finally, there has existed a need for a method of treating or fracturing a subterranean formation characterized by use of a low cost fracturing fluid that is not dependent on precision pH adjustment downhole. The invention addresses these needs.

SUMMARY OF THE INVENTION

Surprisingly, it has been found that the hydrated galactomannan gum component of a low or reduced concentration hydrated galactomannan gum containing fluid may be crosslinked by a suitable metal crosslinking agent if appropriate buffering of the fluid is provided. Moreover, it has been found that buffered, low concentration hydrated metal crosslinked galactomannan gum thickened fluids according to the invention are effective well treatment fluids that are easily transported down well with significant energy saving. Accordingly, in one embodiment, the invention relates to a novel well treatment fluid composition comprising an aqueous hydrated metal crosslinked galactomannan gum solution buffered to a pH of from about 9.0 to about 12, preferably from about 9.5 to about 11.75. More particularly, the invention relates to a well treatment fluid of the galactomannan gum type which is buffered by the addition of or which contains a selected buffering agent or agents in a concentration sufficient to provide or maintain a pH in the solution or fluid of from about 9.0 to about 12. In a preferred embodiment, the invention relates to a well treatment or fracturing fluid of the type described wherein the buffering agent comprises a weak acid and an ammonium or alkali metal salt of a weak acid, the acid and salt being selected to provide a pH of the fluid between 9.0 and 11. In a most preferred embodiment, the invention relates to a fracturing fluid composition comprising an aqueous hydrated borate crosslinked galactomannan gum solution containing a buffering agent, the buffering agent being present in the solution in an amount sufficient to provide the fluid with a pH of from about 9.0 to about 12. As used herein, the term "well treatment" refers generally to operations undertaken with respect to a well and formation, including, but not limited to, fracturing and sand control, while the term "galactomannan gum" is understood to include mixtures of such gums.

In a further embodiment of the invention, the invention relates to a method of treating a subterranean formation penetrated by a borehole, comprising injecting into the borehole and into contact with the formation, at a rate and pressure sufficient to treat the formation, a fluid composition comprising an aqueous hydrated metal crosslinked galactomannan gum solution buffered to a pH of from about 9.0 to about 12. Preferably, the fluid is injected at a pressure sufficient to fracture the formation. More particularly, the invention relates to a method of treating or fracturing characterized by use of a fluid of the galactomannan gum type wherein the buffering agent comprises a weak acid and an ammonium or alkali metal salt of a weak acid, the acid and salt being selected to provide a pH of the fluid of solution between about 9.0 and about 12. In a preferred embodiment, the galactomannan gum is borate crosslinked, and buffering agent is present in the solution in an amount sufficient to provide or maintain the fluid with a pH of from about 9.0 to about 12.

Finally, the invention relates to a process for preparing a fluid of the type described. According to this embodiment of the invention, galactomannan gum is dissolved or suspended in a neutral or acidic aqueous solution to form hydrated galactomannan gum. A crosslinking metal releasing agent and a buffering agent or agents, in a concentration sufficient to provide or maintain a pH in the solution or fluid of from about 9.0 to about 12, are then combined with the hydrated gum, simultaneously, or in any order, to form an aqueous hydrated metal crosslinked galactomannan gum solution buffered to a pH of from about 9.0 to about 12. As used herein, the term "crosslinking metal releasing agent" is taken to designate those metal or metal containing materials which will provide a metal ion or metal containing species in the solution capable of crosslinking the galactomannan gum. Temperatures employed are ambient or greater.

DETAILED DESCRIPTION OF THE INVENTION

As indicated, the fluid compositions of the invention comprise an aqueous hydrated metal crosslinked galactomannan gum solution. Preferred solutions are those derived from guar, hydroxypropyl guar, or carboxymethylhydroxypropyl guar, and mixtures thereof. Initially, the hydrated metal gum solutions may be formed by providing the gum compositions in solid powder form, or as a suspension in a hydrocarbon liquid (e.g., diesel or kerosene) and blending with a neutral or acidic aqueous solution, the hydrate forming a gel. As indicated, it is a surprising advantage of the invention that reduced concentrations of the hydrated crosslinked gum may be employed in the fluid. Preferably, the concentrations of the hydrated metal crosslinked gum will be below 25 pounds per 1000 gallons, being most preferably from about 10 pounds to 25 pounds per 1000 gallons, it being understood that higher amounts may be employed. Superior advantages accrue at levels of from 10 to 22 pounds per 1000 gallons of fluid.

Any suitable crosslinking metal ion, metal containing species, or mixture of such ions and species may be employed. Accordingly, as used herein, the term "metal crosslinked" is understood to include crosslinking attributable to certain metal containing species, such as borate ion. The crosslinking ions or species may be provided, as indicated, by dissolving into the solution compounds containing the appropriate metals, or by other means. Exemplary metal ions or metal containing species include those of boron, zirconium, and titanium, supplied from compounds such as boric acid, sodium borates, boron oxide, zirconium oxide, and titanium oxide. The concentration of added crosslinking metal releasing agent is dependent on factors such as the temperature and the amount of thickening agent employed, and will normally range from about 5 ppm to about 100 ppm, preferably from about 10 ppm to about 60 ppm. It is an important advantage of the invention that higher levels of the crosslinking metal ion or metal containing species may be employed, thereby insuring improved crosslinking. While cross-linking may be virtually immediate, a slight delay thereof, e.g., up to twenty seconds or so, may actually be preferred in the field since it allows mixing and pumping of the precursor solution through surface equipment, formation of the composition being feasible on the fly.

Any buffering agent or combination of such that will provide or maintain the solution at the necessary pH required may be employed. Thus, the combination of a weak acid and its salts may be employed, so long as the pH of the solution is maintained in the range mentioned. For example, the corresponding acid and ammonium and alkali metal phosphates, carbonates, bicarbonates, sesquicarbonates, acetates, or mixtures thereof may be used. Ammonium, potassium, and sodium carbonates, bicarbonates, sesquicarbonates and hydrogen phosphates are preferred as buffer salt components. For pH values toward the upper end of the range specified, combinations of alkali metal hydroxide and appropriate weak acid salt may be employed. For example, a buffer comprising a base such as NaOH IOH and a weak acid salt such as $Na_2H_2PO_4$ may be used. Proportioning of the buffer components of the combinations to achieve the desired pH is well within the ambit of those skilled in the art. As will be appreciated by those skilled in the art, other additives commonly employed in fracturing solutions, such as breakers, clays, etc., must be selected so that they do not significantly reduce the pH of the solution. As indicated, the pH required in the various embodiments of the invention ranges from about 9.0 to 11, preferably from about 9.5 to about 10. The amount of buffer required is, of course, an effective amount, i.e., an amount sufficient to maintain the desired pH, given the additives and other components of the fluid. Preferably, this amount will not exceed 50 pounds per 1000 gallons of fluid, most preferably, not more than about 20 pounds per 1000 gallons of fluid.

In order to illustrate the invention more fully, the following procedures were performed.

Base fluids comprising fifteen pounds and twenty pounds of guar respectively per 1000 gallons of fresh water, optionally containing KCl or similar salt, were prepared, and the guar in each was allowed to hydrate. The fluids also contained minor amounts of normal, non-active (from the standpoint of crosslinking activity) fracturing fluid additives such as a surfactant, a biocide, and a defoamer. These fluids were used in the tests reported hereinafter. Sodium sesquicarbonate and sodium carbonate were added as a buffering agent to each base fluid in the amount of 12 pounds and 5 pounds, respectively, per 1000 gallons. Finally, boric acid, as a 3.5 percent by weight solution in water, based on the weight of the water and acid, was mixed with each of the base fluids containing the buffer to give a concentration of 1.5 pounds of boric acid per 1000 gallons. Borate crosslinking of the guar was effected within 5 to 20 seconds.

To demonstrate the suitability of the fluids for fracturing, viscosity tests were performed. The conditions of and results of the tests are given in the tables below. Table I reports results with the 15 pound solution, while Table II reports results with the 20 pound solution. In both tables, viscosity results are rounded to the nearest 5th unit.

TABLE I

| Temperature | Viscosity, Initial | 100 sec$^{-1}$ (cp) Final (3 hours) |
|---|---|---|
| 1) 100° F. | 135 | 120 |
| 2) 125° F. | 140 | 110 |
| 3) 150° F. | 140 | 105 |

TABLE II

| Temperature | Viscosity, Initial | 100 sec$^{-1}$ (cp) Final (3 hours) |
|---|---|---|
| 1) 100° F. | 350 | 275 |
| 2) 125° F. | 370 | 255 |
| 3) 150° F. | 290 | 250 |
| 4) 175° F. | 285 | 180 |

As those skilled in the art will be aware, upon completion of fracturing, removal or breakdown of the fluid in the fracture is important, compositions called breakers (e.g., ammonium persulfate or peroxide) being employed to assist in such. The retained conductivity of the formation after such withdrawal and/or breakdown is an important measure of fracturing fluid efficiency. Accordingly, standardized retained conductivity tests were run on two fluids according to the invention, utilizing a combination breaker system, the fluids containing 15 pounds (A) and 20 pounds (B), per 1000 gallons, respectively, of hydrated borate crosslinked galactomannan gum thickener. Each fluid was buffered with 12 pounds of sodium sesquicarbonate and 5 pounds of sodium carbonate. Proppant type was 20/40 Badger sand at a concentration of 2 lbs/sq.ft. A two percent by weight KCl solution was used as a base line solution. Results are shown in Table III.

TABLE III

| Fluid | Temp °F. | Breaker lbs/ 1000 gal. | Closure Pressure (psi) | Final Polymer Conc lbs/1000 gal | Conductivity (Darcy) | Percent Retained Conductivity |
|---|---|---|---|---|---|---|
| 2% KCl | 125 | 0 | 2000 | — | 216 | — |
| A | 125 | 2.5 (Tot.) | 2000 | 159 | 130 | 60 |
| B | 125 | 3.0 (Tot.) | 2000 | 188 | 106 | 49 |

Static fluid coefficients for fluids according to the invention were determined utilizing standard fluid loss coefficient procedures. Results are shown in Table IV.

TABLE IV

| Fluid (lbs/1000 gal) | Temp. °F. | Permeability (md) | Cw (ft/min$^{1/2}$) | Spurt (gal/100 ft$^2$) |
|---|---|---|---|---|
| 15 | 100 | 0.76 | 0.0017 | 1.82 |
| 15 | 125 | 0.77 | 0.0018 | 0.15 |
| 15 | 150 | 0.73 | 0.0023 | 5.17 |

TABLE IV-continued

| Fluid (lbs/1000 gal) | Temp. °F. | Permeability (md) | Cw (ft/min$^{1/2}$) | Spurt (gal/100 ft$^2$) |
|---|---|---|---|---|
| 20 | 100 | 0.77 | 0.0014 | 0.0 |
| 20 | 125 | 0.80 | 0.0016 | 0.0 |
| 20 | 150 | 0.71 | 0.0013 | 0.0 |
| 20 | 175 | 0.80 | 0.0032 | 0.0 |

These results clearly demonstrate the suitability of the low concentration borate crosslinked guar solution, buffered according to the invention, for use as a fracturing fluid.

In the manner described, supra, a fracturing fluid was prepared containing, per 1000 gallons, 10 pounds of guar, 1.5 pounds of boric acid, and 5 pounds each of sodium bicarbonate and sodium carbonate. Viscosity of solution at 90° F. was 170 sec-1 with greater than 100 cp. This further experiment demonstrates the ability of the borate-buffer combination to crosslink very reduced concentrations of galactomannan gum.

What is claimed is:

1. A method of fracturing a subterranean formation penetrated by a borehole using a reduced polymer concentration fracturing fluid, the method comprising injecting into the borehole and into contact with the formation, at a rate and pressure sufficient to fracture the formation, a basic fracturing fluid comprising less than about twenty-four pounds of aqueous hydrated metal crosslinked galactomannan gum per 1000 gallons of said fluid, the fracturing fluid made basic by employment of buffers effective at a predetermined pH range of from about 9 to about 11, wherein pH control is achieved downhole within said predetermined pH range without a substantial pH shift from acidic to basic during injection of the fluid into the borehole and into contact with the formation, wherein the buffers effectively resist pH change as a function of temperature.

2. The method of claim 1 wherein a metal crosslinker is utilized to crosslink the aqueous hydrated metal crosslinked galactomannan gum fluid, the metal crosslinker being selected from the group of metal crosslinkers consisting of boron, zirconium, and titanium.

3. The method of claim 1 further wherein the metal is boron.

4. A method of fracturing a subterranean formation penetrated by a borehole using a reduced polymer concentration fracturing fluid, the method comprising injecting into the borehole and into contact with the formation, at a rate and pressure sufficient to fracture the formation, a basic fracturing fluid composition comprising less than about twenty-four pounds/1000 gal of an aqueous hydrated metal crosslinked galactomannan gum fluid, the fluid comprising a metal crosslinker, the metal crosslinker being selected from the group of metal crosslinkers consisting of boron, zirconium, and titanium, and a buffering agent, further wherein the buffering agent maintains a predetermined pH range in the fluid on the basic side of neutral during injection of the fluid into the formation, wherein the buffers effectively resist pH change as a function of temperature, the buffering agent comprising at least one member selected from ammonium, potassium, and sodium carbonates, bicarbonates, sesquicarbonates, and hydrogen phosphates, in an amount sufficient to provide a pH of about 9 to about 11 in the fluid.

5. The method of claim 4 further wherein the metal is boron.

6. The method of claim 4 further wherein the metal is zirconium.

7. The method of claim 4 further wherein the metal is titanium.

8. A method of fracturing a subterranean formation penetrated by a borehole, comprising injecting into the borehole and into contact with the formation, at a rate and pressure sufficient to fracture the formation, a basic fracturing fluid comprising less than about twenty-four pounds of aqueous hydrated metal crosslinked galactomannan gum per 1000 gallons of said fluid, buffered to a predetermined pH range of from about 9 to about 11, wherein pH control is achieved downhole within said predetermined pH range without a substantial pH shift from acidic to basic during injection of the fluid into the borehole and into contact with the formation, further wherein the metal crosslinker utilized is boron, the crosslinking being achieved by crosslinking the galactomannan gum with the metal boron to form the crosslinked galactomannan gum.

9. A method of fracturing a subterranean formation penetrated by a borehole, comprising injecting into the borehole and into contact with the formation, at a rate and pressure sufficient to fracture the formation, a basic fracturing fluid composition comprising less than 30 pounds of an aqueous hydrated metal crosslinked-galactomannan gum per gallon of said fluid and a buffering agent, further wherein the buffering agent maintains a predetermined pH range in the fluid on the basic side of neutral during injection of the fluid into the formation, the buffering agent comprising at least one member selected from ammonium, potassium, and sodium carbonates, bicarbonates, sesquicarbonates, and hydrogen phosphates, in an amount sufficient to provide a pH of from about 9 to about 11 in the fluid, further wherein the metal crosslinker is boron.

10. A method of fracturing a subterranean formation penetrated by a borehole, comprising:

(a) injecting into the borehole and into contact with the formation, at a rate and pressure sufficient to fracture the formation, a basic fracturing fluid composition, the fluid comprising:

i. an aqueous hydrated metal crosslinked galactomannan gum fluid, and ii. a buffering agent;

(b) further wherein the buffering agent maintains a predetermined pH range in the fluid on the basic side of neutral during injection of the fluid into the formation, the buffering agent facilitating buffering of the fluid substantially without change from acidic to basic during pumping;

(c) the buffering agent comprising at least one member selected from ammonium, potassium, and sodium carbonates, bicarbonates, sesquicarbonates, and hydrogen phosphates, in an amount sufficient to provide a pH of from about 9 to about 11 in the fluid;

(d) further wherein the metal of the aqueous hydrated metal crosslinked galactomannan gum fluid is boron;

(e) wherein the concentration of galactomannan gum in the fluid is of a reduced level, in a concentration of about 24 lbs/1000 gallons of fluid or less.

11. A method of fracturing a subterranean formation penetrated by a borehole utilizing a low concentration hydrated galactomannan gum containing fluid comprising injecting into the borehole and into contact with the formation, at a rate and pressure sufficient to fracture the formation, a fracturing fluid comprising from about 10 to about 24 pounds of aqueous hydrated metal crosslinked galactomannan gum per 1000 gallons of said fluid and buffered to a pH of from about 9.0 to about 12.

12. The method of claim 11 wherein the crosslinking metal is boron.

13. A method of fracturing a subterranean formation penetrated by a borehole utilizing a low concentration hydrated galactomannan gum containing fluid comprising injecting into the borehole and into contact with the formation, at a rate and pressure sufficient to fracture the formation, a fracturing fluid composition comprising an aqueous hydrated metal crosslinked galactomannan gum and a buffering agent comprising at least one member selected from ammonium, potassium, and sodium carbonates, bicarbonates, sesquicarbonates, and hydrogen phosphates, in an amount sufficient to provide a pH of from about, 9.0 to about 12 in the fluid composition.

14. The method of claim 13 wherein the crosslinking metal is boron.

15. A method of fracturing a subterranean formation penetrated by a borehole using reduced concentrations of galactomannan gum in the fluid, comprising injecting into the borehole and into contact with the formation, at a rate and pressure sufficient to fracture the formation, a fracturing fluid formed by dissolving or suspending galactomannan gum in neutral or acidic solution in an amount of from about 10 to about 30 pounds of galactomannan gum per 1000 gallons of said fluid, and simultaneously, or in any order, adding crosslinking metal releasing agent and a buffering agent in a concentration sufficient to provide a fracturing fluid buffered to a pH of from about 9 to about 12. the buffering agent being effective at the crosslinking pH of the fluid.

16. The method of claim 15 wherein the crosslinking metal is boron.

* * * * *